US007553436B2

(12) United States Patent
Dukler et al.

(10) Patent No.: US 7,553,436 B2
(45) Date of Patent: Jun. 30, 2009

(54) SYSTEM AND METHOD FOR OPTIMIZING TABLET FORMATION BY A ROTARY PRESS MACHINE

(75) Inventors: Semen Dukler, Brooklyn, NY (US); Lev Tsygan, Brooklyn, NY (US); Michael Levin, West Orange, NJ (US)

(73) Assignee: Metropolitan Computing Corporation, East Hanover, NJ (US)

(*) Notice: Subject to any disclaimer, the term of this patent is extended or adjusted under 35 U.S.C. 154(b) by 60 days.

(21) Appl. No.: 11/934,488

(22) Filed: Nov. 2, 2007

(65) Prior Publication Data

US 2009/0115090 A1 May 7, 2009

(51) Int. Cl.
*B29C 43/08* (2006.01)

(52) U.S. Cl. .................... 264/40.7; 264/40.1; 264/109; 264/123; 425/145; 425/345

(58) Field of Classification Search ...................... None
See application file for complete search history.

(56) References Cited

U.S. PATENT DOCUMENTS 4,062,914 A * 12/1977 Hinzpeter .................. 264/40.1
4,396,564 A * 8/1983 Stuben et al. .............. 264/40.5
6,106,262 A * 8/2000 Levin et al. .................. 425/140
6,482,338 B1 * 11/2002 Levin et al. ................ 264/40.1
6,612,827 B1 * 9/2003 Minke et al. ................ 425/135
2008/0308961 A1 * 12/2008 Kotzur et al. ............... 264/113

* cited by examiner

*Primary Examiner*—Mary Lynn F Theisen
(74) *Attorney, Agent, or Firm*—Lucas & Mercanti, LLP

(57) ABSTRACT

Rotary press machine including dies, pairs of upper and lower punches with a part of each lower punch being movable in a respective die to selectively enable formation of a cavity in the die, a feeding system for feeding powder material into the cavities, when present, in a feeding stage, a pressing system for pressing the upper and lower punches together in a pressing stage and a tablet ejection system for ejecting formed tablets from the dies in a tablet ejection stage. The upper and lower punches are rotated sequentially through the feeding stage, the pressing stage and the tablet ejection stage to thereby enable formation of tablets if powder material is feed into the cavities in the dies. To enable selective formation of tablets and thereby optimize production thereof, an adjustment mechanism is provided and enables selective formation of the cavities in the dies.

20 Claims, 6 Drawing Sheets

SYSTEM AND METHOD FOR OPTIMIZING TABLET FORMATION BY A ROTARY PRESS MACHINE

FIELD OF THE INVENTION

The present invention relates to an improved rotary press machine, which enables optimized tablet formation and to systems and methods for optimizing the production of tablets being produced on a rotary press machine. The present invention also relates to a technique for retrofitting an existing rotary press machine to optimize tablet formation.

BACKGROUND OF THE INVENTION

Rotary press or tableting machines typically include one or more dies, a feeder mechanism for feeding powder material into each die, and upper and lower punches which are brought together to press the powder material in each die to form a tablet. In advance of a feeding position at which the feeding mechanism feeds powder material into each die, the lower punch is lowered by a lowering cam from a tablet ejection position (where the lower punch is leveled or slightly projects above the die top and a previously formed tablet, when present, is ejected from the die) to an overfill position. Lowering of the lower punch via the lowering cam creates a cavity inside the die that is subsequently filled with powder material at the feeding position, which powder material is compacted after the die passes the feeding mechanism, i.e., by passing the upper and lower punches through a pressing stage.

An example of such a rotary press machine is a rotary press machine designated as 102i Laboratory Tablet Press manufactured by Fette GmbH.

Another example is disclosed in U.S. Pat. No. 6,761,554 which discloses a rotary press machine including a press turret with upper and lower carousels in which upper and lower punch assemblies are removably supported. The punch assemblies include a die portion having a material chamber in which the material to be compressed is delivered.

In prior art rotary press machines, during every revolution of the press turret (regardless of the operating parameters thereof), at least one compact is produced from each die. This unavoidably leads to a waste of powder material during set-up or start-up of the machine as well as during shut down of the machine, since tablets produced at that time are made at a slower speed, or otherwise in the presence of one or more other non-acceptable operating parameters, and thus are invariably imperfect and must be discarded. This drawback is especially significant when rotary press machines are used for research and development purposes at the stage of a new formulation development because in such situations, there is usually only a limited amount of powder material available. Waste of such powder material is therefore an extremely significant problem.

While research press machines of a linear type exist, such as compaction simulators, such machines produce individual tablets and can operate with small amounts of material at high speed but in comparison with rotary machines they are much less efficient in manufacturing larger batches of tablets needed for extensive tests or clinical studies.

OBJECTS AND SUMMARY OF THE INVENTION

An object of the present invention is to provide a new rotary press machine utilizing a method and a system for optimizing the production of tablets.

It is another object of the present invention to provide a method for compacting individual tablets as well as batches on rotary press machines, and an apparatus to facilitate this method.

A significant feature of the invention is to control the tableting process on a running press with a mechanism that prevents powder from filling dies when tablet compaction is not needed and allows filling a die (or dies) whenever it is desired. This reduces and possibly eliminates waste of powder material being fed into dies of the rotary press machine during set-up, start-up and shut-down stages, or otherwise when the rotary press machine is not at acceptable operating conditions, so that substantially all of the powder material can be fed into the dies under optimal tablet formation conditions.

In order to achieve this object and possibly others, a rotary press machine in accordance with the invention includes an adjustment mechanism that enables selective formation of the cavities in the dies. When cavities are formed, the feeding system is able to feed powder material into the dies and when cavities are not formed, the feeding system does not feed powder material into the dies.

In one embodiment, the cavities are selectively formed based on the position of the lower punches relative to the dies. Thus, the vertical position or height of the lower punches is controlled by the adjustment mechanism to either close the opening of the dies and prevent cavity formation, or allow formation of a cavity. Control of the vertical position of the lower punches is achieved using a disengageable lowering cam. The lowering cam is engaged when tablet formation is desired and disengaged when tablet formation is not desired. This enables tablet formation only during optimal conditions, which will increase the likelihood of acceptable tablets being formed and thereby optimize tablet formation.

A related method for controlling a rotary press machine to optimize tablet formation includes rotating pairs of upper and lower punches sequentially through a feeding stage in which powder material is fed into a cavity selectively formed in a die by the lower punch, a pressing stage in which the upper and lower punches are pressed together and a tablet ejection stage in which a tablet formed in the die is ejected, feeding powder material into each die only when a cavity is formed in the die. When the cavities are not formed, powder material cannot be fed into the dies. The selective formation of the cavities may be accomplished by selectively adjusting a position of each lower punch relative to its respective die such that the lower punch either forms a cavity in the die or closes an opening of the die thereby preventing formation of a cavity in the die. As such, cavities can be formed only when the upper and lower punches are rotating at a normal production speed and thus tablet formation optimized.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1:
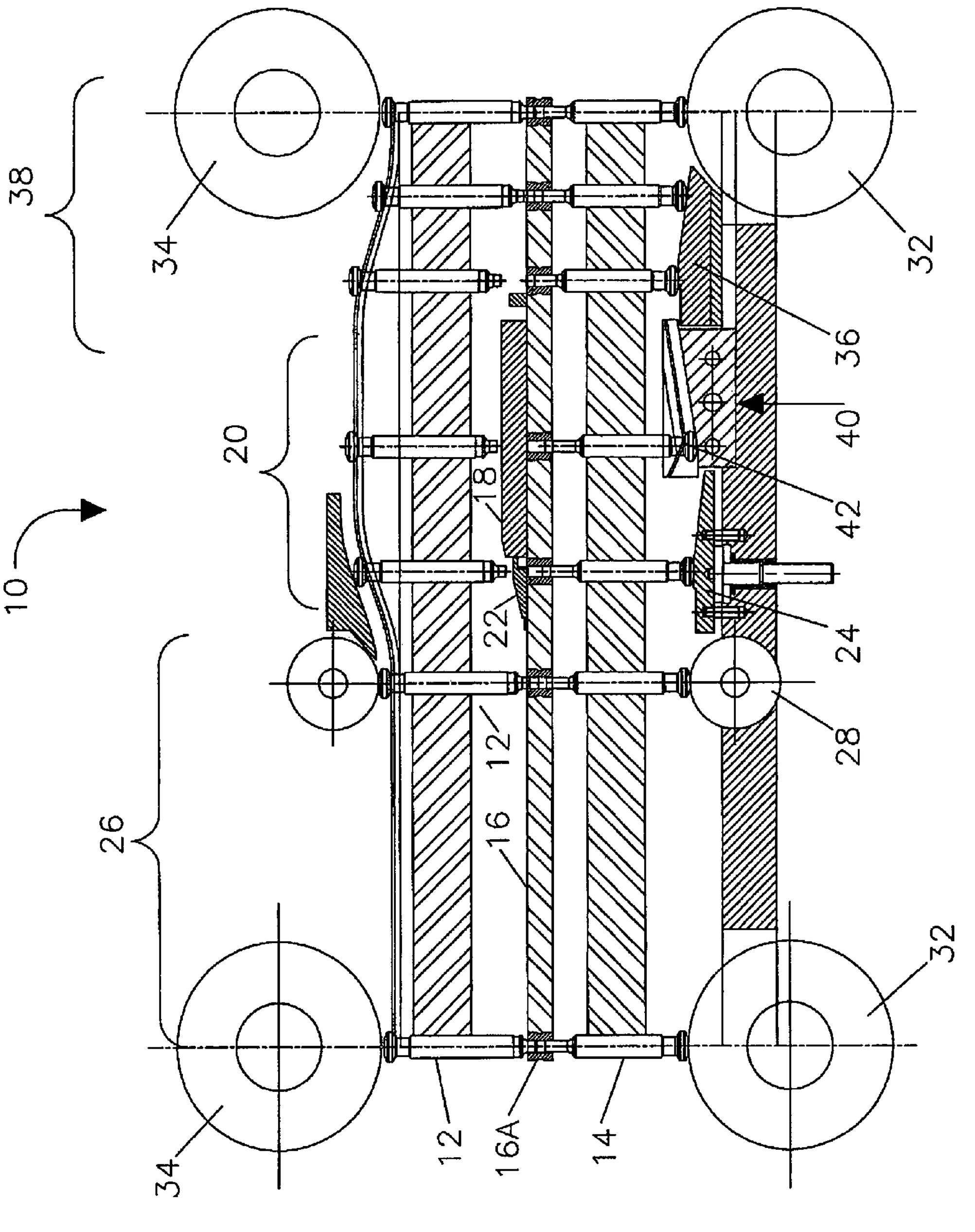
FIG. 1 shows the various stages of the rotary press machine operating under optimal tablet formation conditions as tablets are being compacted.
Figure 4:
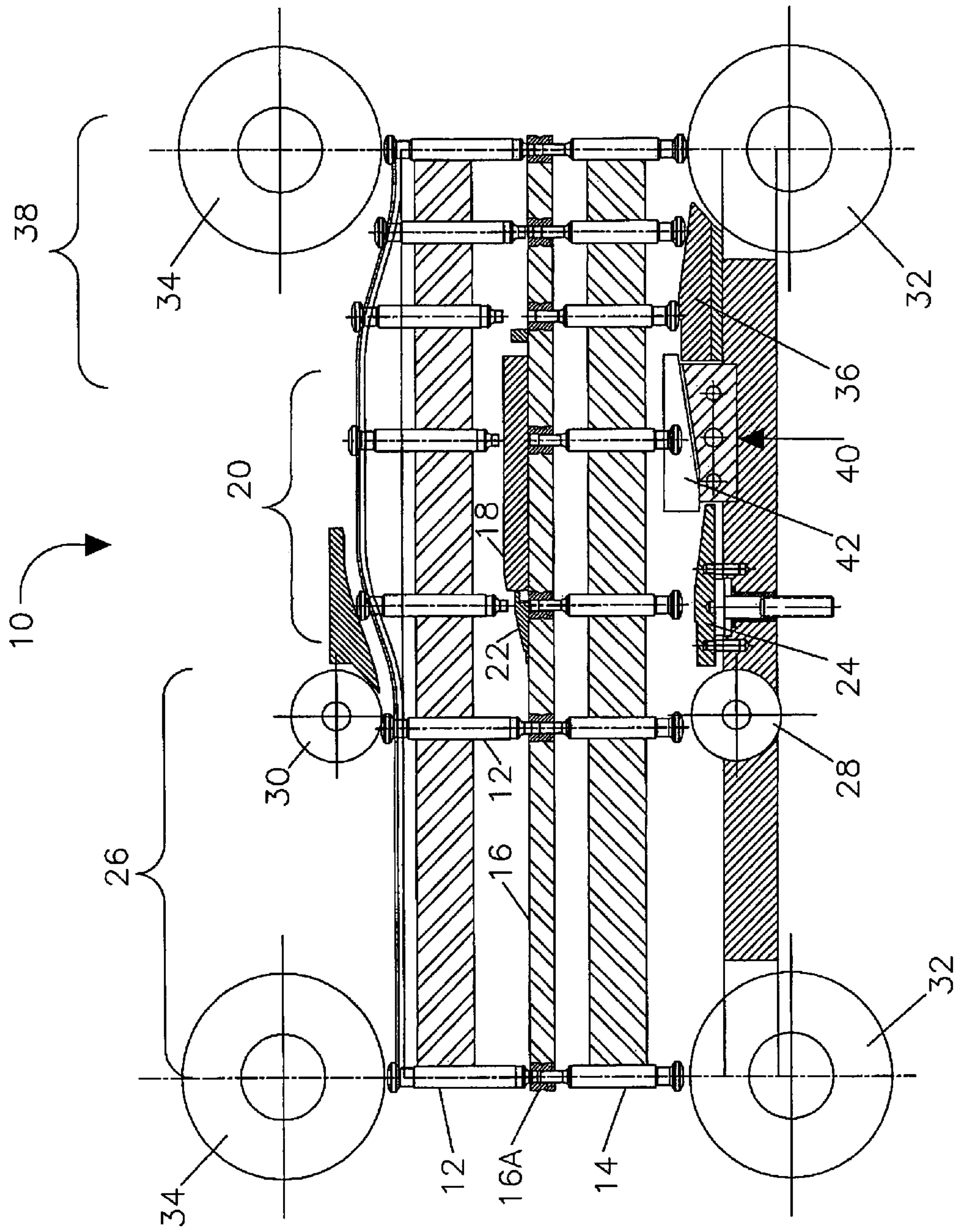
FIG. 4 shows the various stages of the rotary press machine operating under non-optimal tablet formation conditions as tablets are not being compacted.

Referring to the accompanying drawings wherein like reference numerals refer to the same or similar elements, FIGS. 1 and 4 show an example of a rotary press machine 10 which is capable of compacting individual tablets as well as large batches at production speeds, and to which the system and method in accordance with the invention have been applied. The system and method in accordance with the invention can be applied to different rotary press machines regardless of their particular design.

A principle concept of the invention is to prevent powder material from being filled into the dies in a rotary press machine at the feeding stage when it is not desired, and to permit a feeding mechanism to feed powder material into dies only when it is desired. In this manner, the quantity of powder material spent to form tablets is optimized with little or no waste of tablets. In prior art rotary press machines, lowering cam is always engaged with the passing lower punches moving them down and creating cavities in the dies that are filled with the powder.

This concept will be explained with reference to the non-limiting example of the rotary press machine shown in FIGS. 1 and 4, which includes a plurality of pairs of upper punches 12 and lower punches 14, and a die table 16 on which lower punches 14 are guided in each die 16A. The lower punch 14 moves vertically relative to each die 16A to selectively define a cavity in the die 16A into which powder material can be filled, i.e., a powder material to form a tablet upon subsequent pressing of the upper and lower punches 12, 14 together. The upper and lower punches 12, 14 and die 16A are rotated by a rotation system (not shown), which is standard for rotary press machines. FIGS. 1 and 4 are views of the circumference of the rotary press machine 10 wherein the upper and lower punches 12, 14 are rotated in a direction from right to left.

The rotary press machine 10 includes a feeding system 18 for feeding powder material into the dies 16A in a feeding stage 20. The feeding system 18 is arranged to feed the powder material into each die 16A when the tip of a lower punch 14 is lower than the upper level of the die 16A. The vertical position of the lower punches 14 relative to the dies 16A is controlled, in the illustrated embodiment, by engaging or disengaging a lowering cam 42 of the design presented in this invention. The feeding system 18 can be any known feeding system, mechanism, arrangement or assembly used to fill material into dies, including but not limited to a feeder and a hopper.

A material scraper 22 is arranged after the feeding mechanism 18 in the direction of rotation of the upper and lower punches 12, 14 and scrapes excess powder material from the dies 16A. A depth-of-fill adjustment mechanism 24 adjusts the height of the lower punches 14 to provide a desired level of powder material in the dies 16A before tablet compaction. The depth-of-fill mechanism 24 and material scraper 22 are situated at the beginning of a tableting stage 26 in which the upper and lower punches 12, 14 are pressed together, with a die therebetween, by a pair of pre-pressure rolls 28, 30 and then by main pressure rolls 32, 34 (shown twice in FIG. 1 since the illustration is of the circumference of the rotary press machine 10). Instead of the pre-pressure rolls 28, 30 and the main pressure rolls 32, 34, other pressing systems, mechanisms, arrangements or assemblies for pressing the upper and lower punches 12, 14 together with the die therebetween in a pressing stage may be applied in the invention.

A tablet ejection system 36 is arranged in a tablet ejection stage 38 after the tableting stage 26 in the direction of rotation of the upper and lower punches 12, 14. The tablet ejection system 36 may be any known system, mechanism, arrangement or assembly which is capable of ejecting or otherwise removing a tablet from a die. In the illustrated embodiment, the tablet ejection system 36 is a tablet ejection cam which raises the lower punches 14 relative to the die table 16 to thereby push the formed tablet out of the die.

In operation, the upper and lower punches 12, 14 are rotated sequentially through the feeding stage 20, the tableting stage 26 and the tablet ejection stage 38 by a known rotation system (not shown) which is usually coupled to the upper and lower punches 12, 14. The rotation system provides variable speeds of rotation of the upper and lower punches 12, 14. Thus, once the rotary press machine 10 is started, the rotation system begins to rotate the upper and lower punches 12, 14, gradually increasing the speed during set-up and start-up of the rotary press machine 10 until a predetermined, normal production speed is achieved. Once this normal production speed is achieved, the rotation system maintains this speed until production of tablets is to cease. At this time, the rotation mechanism reduces the speed until the upper and lower punches 12, 14 are stationary, i.e., shut-down. The operator of the rotary press machine determines the normal production speed in a manner known to those skilled in the art.

To avoid the formation of imperfect tablets which occurs if the rotary press machine 10 operates at rotation speeds other than the predetermined, normal production speed, i.e., during the set-up, start-up and shut-down stages when the rotation speeds is increasing to or decreasing from the normal, production speed, and make it possible to produce individual tablets or batches on a running press equipped with single or multiple sets of tooling, a height adjustment system 40 is provided to adjust the vertical position or height of the lower punches 14 relative to the feeding system 18, to thereby selectively form or prevent formation of powder material-receiving cavities in the dies. Height adjustment system 40 is operated such that only when it is necessary or desired, the lower punches 14 are lowered such that the dies 16A therein are open and powder material-receiving cavities are formed, and thus are receivable of powder material from the feeding system 18 (see FIG. 1). On the other hand, the height adjustment system 40 can be controlled such that the lower punches 14 being restrained with punch clips 59 maintain the highest vertical position they have reached when passing the tablet ejection cam of the tablet ejection system 36 and the openings of the dies are closed with the tips of the lower punches 14 (see FIG. 4). This prevents formation of a powder material-receiving cavity in each die. As such, the dies cannot receive powder material from the feeding system 18.

By selectively adjusting the height of the lower punches 12, 14 in the foregoing manner, the use of the powder material can be optimized and filled into the dies only when the rotational speed of the upper and lower punches 12, 14 is an acceptable or normal production speed which would almost assuredly provide acceptable tablets.

The height adjustment mechanism 40 includes a lowering cam 42 arranged to selectively engage with the lower punches 14. The lowering cam 42 has an engaged position in which it engages with the lower punches 14 to cause the lower punches 14 to be lowered such that the dies in the lower punches 14 are open and form powder material-receiving cavities (shown in FIGS. 1-3), and a disengaged position in which the lowering cam 42 is disengaged from the lower punches 14 (shown in FIGS. 4-6). In the disengaged position, the lower punches 14 are not lowered and therefore, the dies in the lower punches 14 are closed by the lower punches 14 and thus do not form powder material-receiving cavities and therefore cannot receive powder material from the feeding system 18.

Various forms of the lowering cam 42 are possible. In one embodiment, the lowering cam 42 includes a pair of moving guides 44, 46, also referred to as movable punch head guides, arranged opposite one another to define a channel 48 therebetween through which an annular indentation or indented portion 50 of the lower punches 14 pass during their rotation in the rotary press machine 10 (see FIG. 3).

Figure 3:
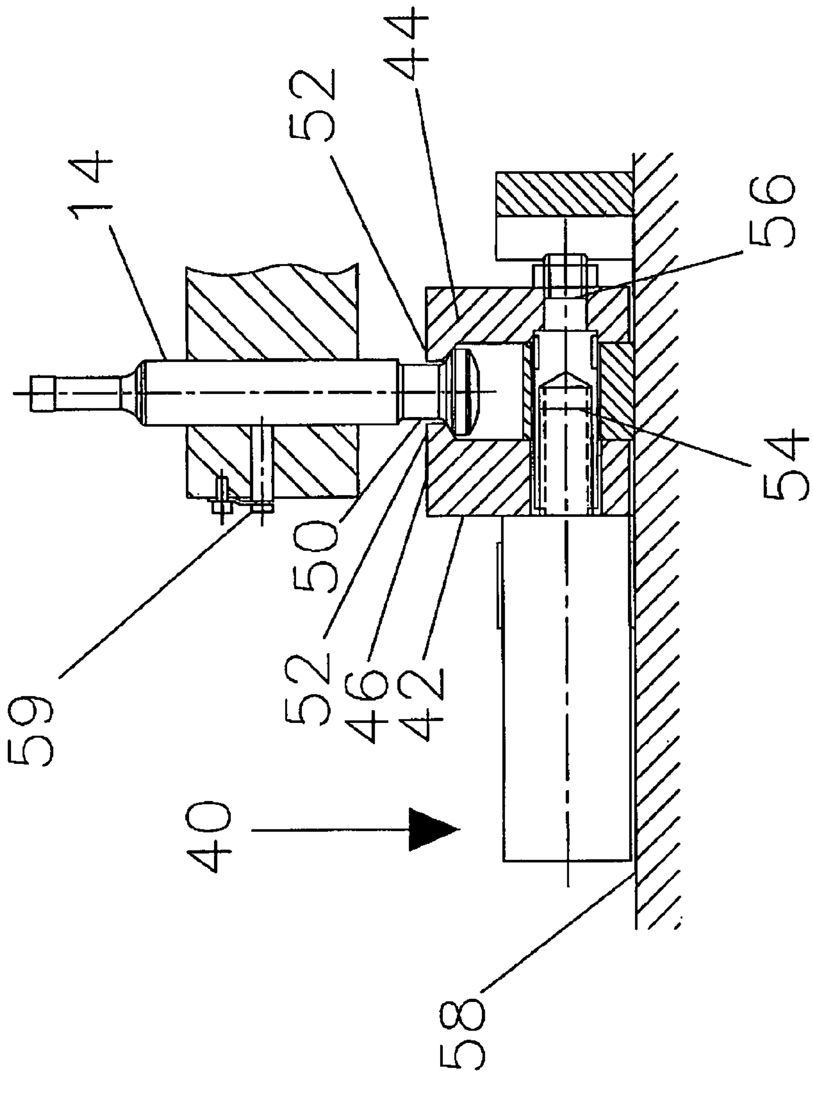
FIG. 3 is a cross-sectional view showing the state of the lower punch height adjustment mechanism in accordance with the invention when the rotary press machine is operating under the conditions of FIG. 1, and which is taken along the line 3-3 of FIG. 2.

The moving guides 44, 46 include a lip 52 arranged relative to the lower punches 14 such that contact between the lip 52 and the indented portion 50 of the lower punches 14 causes the lower punches 14 to slide along the lip 52 during their rotation (see FIG. 3). The vertical displacement of the lower punches 14 in a direction away from the fill level, i.e., the upper surface of the dies 16A, is therefore achieved by appropriate angling of the lip 52 in a direction away from the fill level (see FIG. 1).

Figure 2:
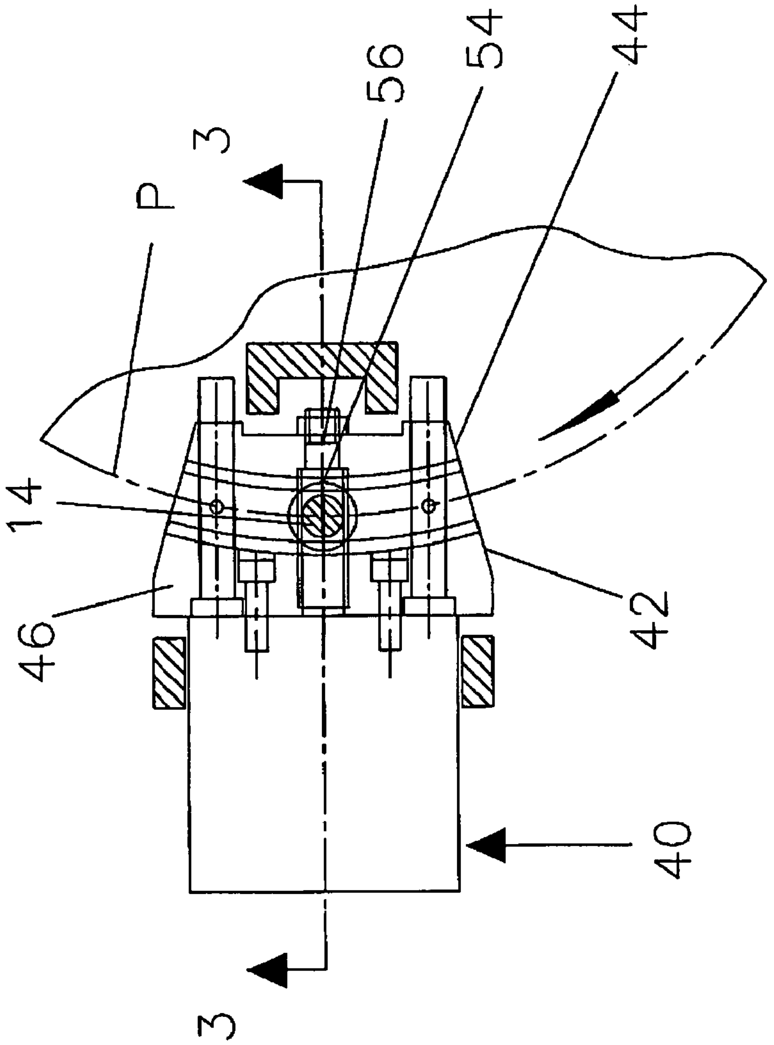
FIG. 2 is a top view of the state of the lower punch height adjustment mechanism in accordance with the invention when the rotary press machine is operating under the conditions of FIG. 1.
Figure 5:
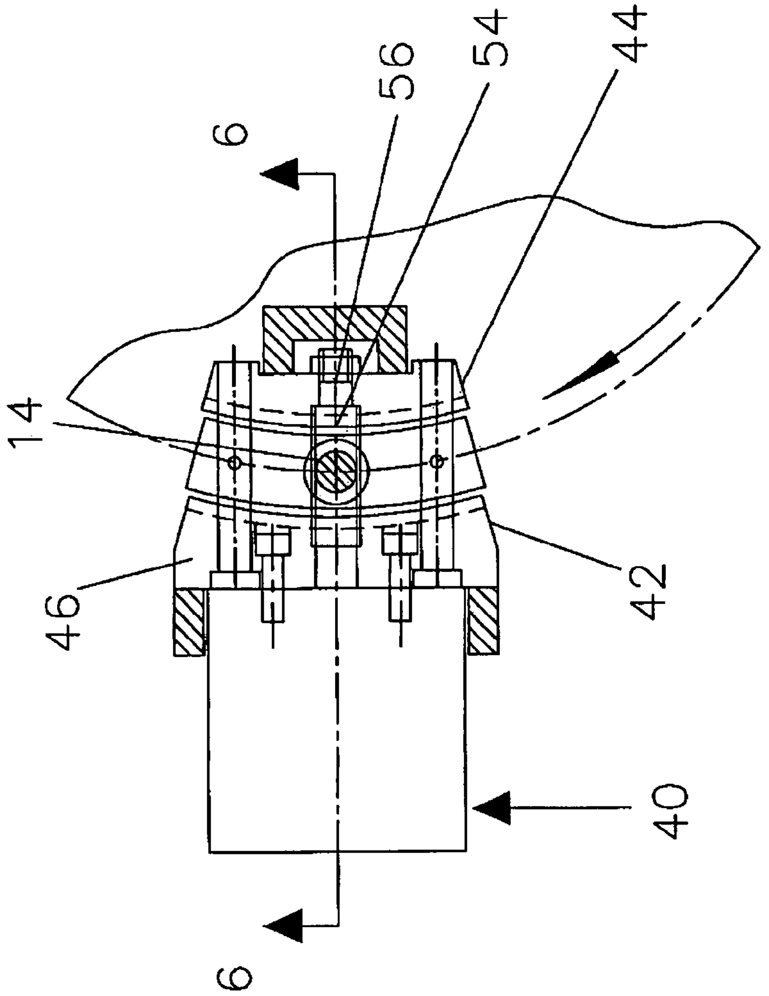
FIG. 5 is a top view of the state of the lower punch height adjustment mechanism in accordance with the invention when the rotary press machine is operating under the conditions of FIG. 4.

Further, the moving guides 44, 46 having an arcuate form as shown in FIGS. 2 and 5. This arcuate form enables the lower punches 14 to be rotated therethrough as they are rotated around the rotary press machine 10 by its rotation mechanism.

To move between engaged and disengaged positions, the moving guides 44, 46, are movable in a radial direction into or out of a position in which the lower punches 14 can engage therewith. Moving guide 44 is arranged inward of channel 48 and moving guide 46 and is therefore moved radially outward to its engaged position and then radially inward to its disengaged position. Conversely, since moving guide 46 is arranged outward of channel 48 and moving guide 44, it is moved radially inward to its engaged position and then radially outward to its disengaged position.

Figure 6:
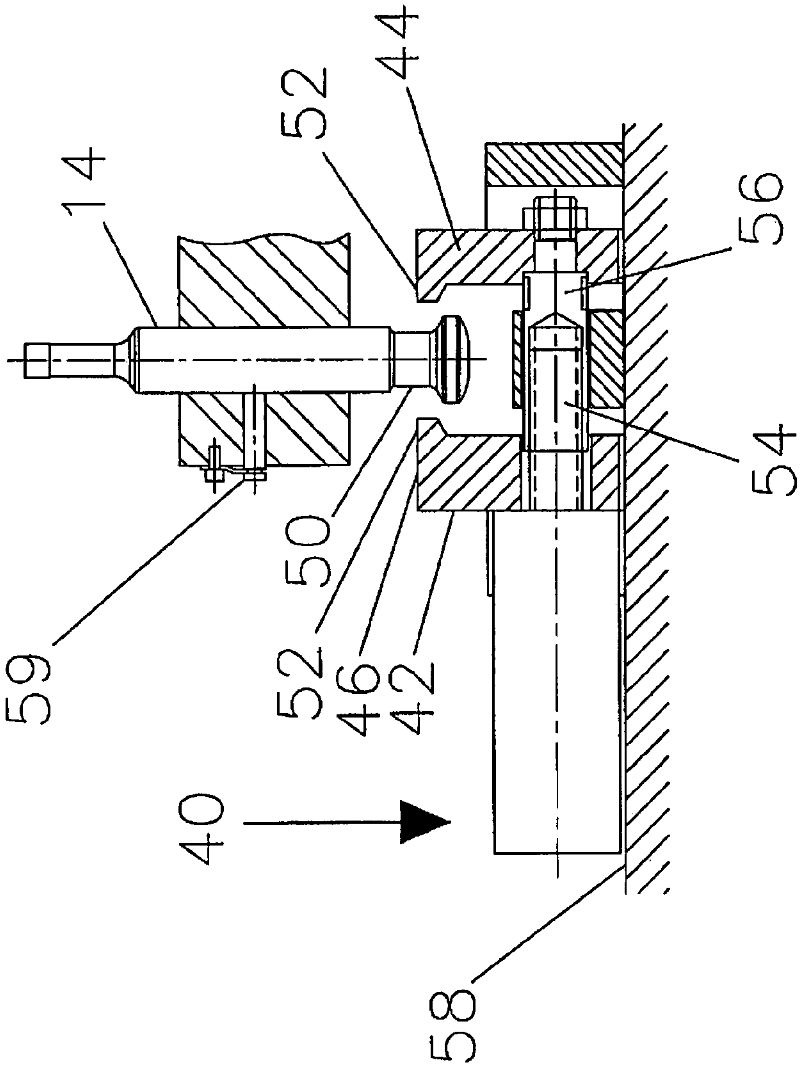
FIG. 6 is a cross-sectional view showing the state of the lower punch height adjustment mechanism in accordance with the invention when the rotary press machine is operating under the conditions of FIG. 4, and which is taken along the line 6-6 of FIG. 5.

Movement of the moving guides 44, 46 between their engaged and disengaged positions may be achieved using any known movement mechanism. For example, an actuator 54 is shown coupled to the moving guides 44, 46 and which brings the moving guides 44, 46 together into their engaged positions and separates them into their disengaged positions. The actuator 54 is mounted to a table 58 or other fixed portion of the rotary press machine 10. Further, the actuator 54 may be a hydraulic air actuator and the like. When a rod 56 of the actuator 54 is retracted as shown in FIG. 3, the moving guides 44, 46 are in their engaged positions and when the rod 56 is extended as shown in FIG. 6, the moving guides 44, 46 are in their disengaged positions.

In the illustrated embodiment, both moving guides 44, 46 are movable to provide the lowering cam 42 with its engaged and disengaged positions. However, in one embodiment, only one of the moving guides 44 or 46 is movable and the other is fixed. In this case, movement of the single moving guide 44 or 46 serves to provide the lowering cam 42 with its engaged and disengaged positions.

The engagement or disengagement of the lowering cam 42 can be controlled based on several factors. Importantly, it is based on the rotational speed of the rotary press machine 10 as mentioned above so that once the rotational speed is a speed which will almost ensure acceptable tablet formation, the lowering cam 42 is engaged. Another parameter is the force of the upper and lower punches 12, 14. In this case, the force of the upper and lower punches 12, 14 can be determined and if inadequate to ensure formation of acceptable tablets, the lowering cam 42 will not be engaged or will be disengaged if already engaged. Control of the lowering cam 42 may also be based on analysis of the tablets being formed, e.g., their thickness, or the operation of the machine, e.g., the movement of the upper and lower punches 12, 14, so that whenever an operator or a computer control unit determines that the conditions for tablet formation are not optimal, the lowering cam 42 will not be engaged or will be disengaged if already engaged.

In the embodiment described above, the height adjustment mechanism 40 is operative to selectively adjust the height of the lower punches 14 relative to the feeding system 18, so that powder material can or cannot be filled into the dies in the lower punches 14 (e.g., depending on the rotational speed of the rotary press machine 10 as described above). Another embodiment is contemplated wherein the difference in height between the dies 16A in the lower punches 14 at the feeding stage 20 and the outlet of the feeding system 18 is selectively adjusted and controlled by varying the location of the feeding system 18. In such an embodiment, the lower punches 14 would not be vertically displaced but rather the feeding system 18 would be separated from the dies, e.g., by an actuator coupled thereto, so that when the rotational speed of the rotary press machine 10 is a normal production speed, there is an opening between the outlet of the feeding system 18 and the dies 16A in the lower punches 14 (so that powder material is filled into cavities formed in the dies 16A) and when the rotational speed of the rotary press machine 10 is below a normal production speed, there is no opening between the outlet of the feeding system 18 and the dies 16A in the lower punches 14 (so that powder material cannot be filled into cavities formed in the dies 16A).

In such a movable feeding system, either the entire feeding system may be movable relative to the dies or only the outlet of the feeding system. The feeding system may take the form of a feeder or a hopper.

A rotary press machine 10 including a height adjustment mechanism 40 in any of its forms described above may be used for set-up, research and development purposes, and serve as a basis for creating rotary type compaction simulators that would allow producing individual tablets as well as batches at high production speeds.

The operating system of the rotary press machine 10 (not shown) may be coupled to the various controlled components including the rotation mechanism, the feeding system 18 and the height adjustment mechanism 40. The operating system provides an input interface to allow an operator to control the operation of the rotary press machine 10. The operator may therefore input a "make a tablet" command to cause the operating system to enable the rotary press machine 10 to initiate formation of a single tablet. Specifically, upon receipt of such a command, the operating system engages the lowering cam 42 to cause the actuator 54 to bring the moving guides 44, 46 into their engaged positions and thus a lower punch 14 to be downwardly vertically displaced away from the fill level such that the lower punch 14 does not close the opening of the die 16A and thereby forming a cavity in the die 16A and permitting powder material to be placed into the formed cavity in the die 16A from the feeding system 18. Thereafter, the actuator 54 is directed to move the moving guides 44, 46 to their disengaged positions. The operating system synchronizes the control commands to the actuator 54 with the position of the lower punch 14 relative to the lowering cam 42.

If the operator inputs a "make a batch" command, the operating system enables the rotary press machine 10 to initiate formation of a batch of tablets. In this case, the operating system engages the lowering cam 42 to cause the actuator 54 to bring the moving guides 44, 46 into their engaged positions and thus lower punches 14 to be downwardly vertically displaced away from the fill level such that they do not close the opening of the dies 16A and form cavities in the dies 16A permitting powder material to be placed into the cavities in the dies 16A from the feeding system 18. After the designated number of tablets has been formed, the actuator 54 is directed to move the moving guides 44, 46 to their disengaged positions. The operating system synchronizes the control commands to the actuator 54 with the position of the lower punches 14 relative to the lowering cam 42.

The rotary press machine 10 can therefore be controlled to make individual tablets or a batch of tablets from the powder material being provided to the feeding system 18. An operator thus is provided with increased flexibility when forming tablets from limited amounts of powder material, e.g., during research and development uses of the rotary press machine 10. When the operating conditions of the rotary press machine 10 are determined by the operator, or by sensors, not to be optimal for formation of acceptable tablets, the operator does not issue the "make a tablet" or "make a batch" commands.

The height adjustment mechanism 40 in accordance with the invention, in any of its forms described above, may be included in a new rotary press machine 10 or may be applied as a retrofit of an existing rotary oppress machine. In the latter case, the height adjustment mechanism 40 would be arranged in the rotary press machine in consideration of the position of the feeding system in such a machine and coupled to the operating system of the machine. The height adjustment mechanism 40 would function to control the height difference or separation between the outlet of the feeding system and the lower punches so that it is possible to have the lower punches selectively close the opening of the dies and thereby prevent filling of powder material into the dies.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A rotary press machine, comprising:

a plurality of pairs of upper and lower punches;

a plurality of dies, each of said lower punches being movable in a respective one of said dies to selectively enable formation of a cavity in said die;

a feeding system for feeding powder material into said cavities of said dies in a feeding stage, said feeding system being arranged to feed the powder material into each of said dies only when said die forms a cavity;

a pressing system for pressing said upper and lower punches together in a pressing stage;

a tablet ejection system for ejecting formed tablets from said dies in a tablet ejection stage, said pairs of upper and lower punches being rotated sequentially through said feeding stage, said pressing stage and said tablet ejection stage; and an adjustment mechanism for enabling selective formation of said cavities by said dies such that when said cavities are formed, said feeding system is able to feed powder material into said dies and when said cavities are not formed, said feeding system does not feed powder material into said dies.

2. The rotary press machine of claim 1, wherein said adjustment mechanism is arranged to adjust a height of said lower punches relative to said feeding system such that only when desired, said height adjustment mechanism lowers said lower punches such that said lower punches enable formation of cavities by said dies and thus are receivable of powder material from said feeding system, and when not desired does not lower said lower punches such that said lower punches do not enable formation of said cavities by said dies and thus said dies do not receive powder material from said feeding system.

3. The rotary press machine of claim 2, wherein said height adjustment mechanism comprises a lowering cam arranged to selectively engage with said lower punches such that when said lowering cam engages with said lower punches, said lower punches are lowered, and when said lowering cam is disengaged from said lower punches, said lower punches are not lowered.

4. The rotary press machine of claim 3, wherein said lowering cam comprises at least one moving guide, said lower punches being arranged to movably engage with said at least one moving guide during rotation.

5. The rotary press machine of claim 4, wherein said lower punches each comprise an indentation and said at least one moving guide each comprises a lip arranged relative to said lower punches such that said lip engages with said indentation and causes said lower punches to slide along said lip, said lip being angled in a direction away from said feeding system.

6. The rotary press machine of claim 4, wherein said at least one moving guide is movable in a radial direction into or out of a position in which said lower punches engage therewith.

7. The rotary press machine of claim 6, further comprising an actuator for moving said at least one moving guide.

8. The rotary press machine of claim 4, wherein each of said at least one moving guides has an arcuate form.

9. The rotary press machine of claim 3, wherein said lowering cam comprises a pair of moving guides, said lower punches being arranged to movably engage with said moving guides during rotation.

10. The rotary press machine of claim 9, wherein said lower punches each comprise an annular indentation and each of said moving guides comprises a lip arranged relative to said lower punches such that said lip engages with said indentation and causes said lower punches to slide along said lip, said lip being angled in a direction away from said dies.

11. The rotary press machine of claim 9, wherein a first one of said moving guides is movable in an outward radial direction into a position in which said lower punches engage therewith and in an inward radial direction into a position in which said lower punches are unable to engage therewith and a second one of said moving guides is movable in an inward radial direction into a position in which said lower punches engage therewith and in an outward radial direction into a position in which said lower punches are unable to engage therewith, said first and second moving guide facing one another.

12. The rotary press machine of claim 9, wherein said moving guides have an arcuate form and face one another to define a channel therebetween in which a portion of said lower punches passes.

13. The rotary press machine of claim 9, further comprising an actuator for moving each of said moving guides.

14. In a rotary press machine including a plurality of pairs of upper and lower punches, a plurality of dies, each of the lower punches being movable in a respective one of the dies to selectively enable formation of a cavity in said die, a feeding system for feeding powder material into the cavities of the dies in a feeding stage, a pressing system for pressing said upper and lower punches together in a pressing stage, a tablet ejection system for ejecting formed tablets from the dies in a tablet ejection stage, the pairs of upper and lower punches being rotated sequentially through the feeding stage, the pressing stage and the tablet ejection stage, the improvement comprising:

the feeding system being arranged to feed the powder material into the dies only when the die forms a cavity; and an adjustment mechanism for enabling selective formation of the cavities in the dies such that when the cavities are formed, the feeding system is able to feed powder material into the dies and when the cavities are not formed, the feeding system does not feed powder material into the dies.

15. The rotary press machine of claim 14, wherein said adjustment mechanism is arranged to adjust a height of the lower punches relative to the feeding system such that only when desired, said height adjustment mechanism lowers the lower punches such that the lower punches enable formation of cavities in the dies and thus are receivable of powder material from the feeding system, and when not desired does not lower the lower punches such that the lower punches do not enable formation of the cavities in the dies and thus the dies do not receive powder material from the feeding system.

16. The rotary press machine of claim 15, wherein said height adjustment mechanism comprises a lowering cam arranged to selectively engage with the lower punches such that when said lowering cam engages with the lower punches, the lower punches are lowered, and when said lowering cam is disengaged from the lower punches, the lower punches are not lowered.

17. The rotary press machine of claim 16, wherein said lowering cam comprises at least one moving guide, the lower punches being arranged to movably engage with said at least one moving guide during rotation.

18. A method for controlling a rotary press machine to optimize tablet formation, comprising:

rotating pairs of upper and lower punches sequentially through a feeding stage in which powder material is feed into a cavity selectively formed in a die by the lower punch, a pressing stage in which the upper and lower punches are pressed together and a tablet ejection stage in which a tablet formed in the die is ejected;

feeding powder material into each die only when the die forms a cavity; and selectively forming the cavities in the dies such that when the cavities are formed, powder material is fed into the dies and when the cavities are not formed, powder material cannot be fed into the dies.

19. The method of claim 18, wherein the step of selectively forming the cavities comprises selectively adjusting a position of each lower punch relative to its respective die such that the lower punch either allows the die to form a cavity or closes an opening of the die thereby preventing formation of a cavity in the die.

20. The method of claim 18, wherein the step of selectively forming he cavities comprises forming the cavities only when the upper and lower punches are rotating at a normal production speed.

* * * * *